United States Patent
Hwang et al.

(10) Patent No.: US 8,159,614 B2
(45) Date of Patent: Apr. 17, 2012

(54) IMAGE DISPLAY APPARATUS AND CHANNEL INFORMATION DISPLAY METHOD THEREOF

(75) Inventors: Jeong-Hwan Hwang, Seoul (KR); Mi-Kyoung Jung, Seoul (KR); Seung-Yong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 12/361,993

(22) Filed: Jan. 29, 2009

(65) Prior Publication Data

US 2010/0073565 A1    Mar. 25, 2010

(30) Foreign Application Priority Data

Sep. 25, 2008  (KR) .................. 10-2008-0094359

(51) Int. Cl.
*H04N 5/445* (2011.01)
(52) U.S. Cl. .............. 348/564; 348/731; 348/570
(58) Field of Classification Search ........... 348/56–569, 348/731, 732
See application file for complete search history.

(56) References Cited

U.S. PATENT DOCUMENTS

| | | | |
|---|---|---|---|
| 5,969,769 A | 10/1999 | Hamadate | |
| 6,094,237 A | 7/2000 | Hashimoto | |
| 6,384,869 B1 | 5/2002 | Sciammarella et al. | |
| 6,456,334 B1 * | 9/2002 | Duhault | 348/565 |
| 7,373,650 B1 * | 5/2008 | Rodriguez et al. | 725/41 |
| 2008/0313677 A1 * | 12/2008 | Lee | 725/56 |

FOREIGN PATENT DOCUMENTS

| | | |
|---|---|---|
| EP | 1 677 525 A2 | 7/2006 |
| JP | 9-307827 A | 11/1997 |

* cited by examiner

*Primary Examiner* — Michael Lee
(74) *Attorney, Agent, or Firm* — Birch, Stewart, Kolasch & Birch, LLP (57) ABSTRACT

An image display apparatus and a channel information display method thereof are discussed. According to an embodiment, the method includes displaying an image from a selected channel on at least one region of a screen; sequentially receiving, by a tuner, images from a plurality of channels; storing the received images in a storage unit; and displaying the stored images from the plurality of channels simultaneously on at least multiple regions of the screen in response to a channel information function.

22 Claims, 9 Drawing Sheets

IMAGE DISPLAY APPARATUS AND CHANNEL INFORMATION DISPLAY METHOD THEREOF

RELATED APPLICATION

The present disclosure claims priority to and relates to subject matter contained in Korean Patent Application No. 10-2008-0094359, filed on Sep. 25, 2008, which is herein expressly incorporated by reference in its entirety.

BACKGROUND OF THE INVENTION

1. Field of the Invention

The present invention relates to an image display apparatus capable of displaying various information about different channels, and a channel information display method thereof.

2. Background of the Invention

An image display apparatus serves to reproduce moving images and sounds that are stored in an internal memory or received from an external device. One example of the image display apparatus includes a television configured to receive a broadcasting signal and to output the broadcasting signal.

As the television, analogue televisions configured to receive and output analogue broadcasting signals have been mainly used. However, recently, digital televisions configured to receive and output digital broadcasting signals are being presented.

In the analogue television, one image and one voice signal are transmitted within one frequency band. On the other hand, in the digital television, a plurality of images and voice signals are transmitted, and the images are compressed to be transmitted without degraded quality. Accordingly, images from a plurality of channels can be transmitted within one frequency band.

Due to the development of digital television and various broadcasting media such as sky wave broadcasting, satellite broadcasting, and cable broadcasting, the number of channels that can be received in a television is greatly increased. As a result, an effective method of providing information about various channels to a user is needed.

SUMMARY OF THE INVENTION

Therefore, an object of the present invention is to provide a channel information display method and an image display apparatus capable of allowing a user to easily recognize information about one or more other channels by visually or auditorily displaying such channel information.

Another object of the present invention is to provide a channel information display method of an image display apparatus capable of facilitating channel changes by selecting displayed channel information.

Another object of the present invention is to provide a method and apparatus for displaying moving images from multiple channels simultaneously and selecting a channel among the displayed channels in an advantageous manner.

Another object of the present invention is to provide a method and apparatus for managing and displaying moving images of multiple channels on a screen, which address the limitations and disadvantages associated with the related art.

To achieve these and other advantages and in accordance with the purpose of the present invention, as embodied and broadly described herein, there is provided according to an embodiment a channel information display method of an image display apparatus, comprising: displaying an image received through a selected channel on a screen; sequentially receiving and storing images through one or more channels during the image display; and when a channel information function is executed, displaying the stored images on one or more regions of the screen.

By sequentially receiving and storing images through one or more channels during the image display, and by displaying the stored images when a channel information function is executed, information about various channels may be provided in the form of moving images.

Here, one or more regions of the screen for displaying the stored images may be implemented in a two or three-dimensional manner. Also, the stored images may be displayed on multiple regions of the screen or multiple screens positioned adjacent to each other.

Here, the regions of the screen or the screens for displaying the stored images may be formed in polygonal shapes.

The polygonal shape may include a triangular shape, a rectangular shape, or a polygonal shape having five or more edges. In the case that a screen to display stored channels is formed in a polygonal shape having five or more edges, the number of screens that share edges with a screen to display one channel may be more than five. Here, channel changes may be performed through a simple manipulation between the screens that share edges with each other. Accordingly, when the screens to display channels have five or more edges, the number of channels that can be changed through the simple manipulation may be more than five.

Here, the multiple regions of the screen or screens to display images received through predetermined similar channels may be arranged to be adjacent to one another.

Here, the channel information display method of an image display apparatus may further comprise displaying a cursor on one or more regions of the screen or screens among the screens to display the stored images.

Here, a channel corresponding to a region of the screen having the cursor located thereon may be activated.

Since the screen having the cursor located thereon may be a user's interesting channel among displayed regions of the screen or screens, the region of the screen having the cursor located thereon may be activated to provide a lot of information to the user.

Here, the screen having the cursor located thereon may have a size gradually increasing with respect to the entire screen size.

Since the region of the screen having the cursor located thereon may be a user's interesting channel among displayed regions of the screen, the region of the screen having the cursor located thereon may have a size gradually increased with respect to the entire screen size so as to provide a lot of information to the user.

Here, as a preset time lapses, a channel corresponding to the region of the screen having the cursor located thereon may be set as a main channel.

Here, in the step of receiving, a ratio of time taken to receive an image through a channel corresponding to the region of the screen having the cursor located thereon, with respect to time taken to receive images through all channels, may be increased.

Here, the screen to display the stored images may also display channel guide information about the channels of the stored images.

Here, images received through one or more channels among the displayed channels may be recorded or reservation-recorded.

Here, channel guide information about a channel corresponding to the region of the screen having the cursor located thereon may be displayed.

Here, images received through a channel corresponding to the region of the screen having the cursor located thereon may be recorded or reservation-recorded.

To achieve these and other advantages and in accordance with the purpose of the present invention, as embodied and broadly described herein, there is also provided according to an embodiment an image display apparatus, comprising: a first tuner for receiving images through a selected channels; a second tuner for sequentially receiving images through one or more channels, while displaying the image received by the first tuner; a memory for storing the image received by the second tuner; and a display unit for displaying the stored images on one or more regions of the screen when a channel information function is executed.

Here, one or more regions of the screen for displaying the stored images may be implemented in a two or three-dimensional manner. Also, the stored images may be displayed on multiple regions of the screen or multiple screens that are positioned adjacent to each other.

Here, the regions of the screen or screens to display images received through predetermined similar channels may be arranged to be adjacent to one another.

Here, the channel information display method of an image display apparatus may further comprise displaying a cursor on one or more of the regions of the screen for displaying the stored images.

Here, the display unit may implement a cursor to be displayed on one or more of the regions of the screen or screens for displaying the stored images.

Here, the first tuner may receive images through a channel corresponding to a region of the screen having the cursor located thereon, and the display unit may display the images received by the first tuner on the region of the screen having the cursor located thereon.

Here, the image display apparatus may further comprise a third tuner for receiving images through a channel corresponding to a region of the screen having the cursor located thereon. And, the display unit may display the images received by the third tuner.

Here, the image display apparatus may further comprise a controller to control the second tuner so that a ratio of time taken to receive an image through a channel corresponding to the region of the screen having the cursor located thereon, with respect to time taken to receive images through all channels increases.

Here, the screens for displaying the stored images may also display channel guide information about channels of the stored images.

Here, the controller may perform a video recording function and/or a reservation-video recording function with respect to images received through one or more channels among the displayed channels. And, the memory may store the recorded or reservation-recorded images.

Here, channel guide information about a channel corresponding to a region of the screen having the cursor located thereon may be displayed.

Here, an image received through the channel corresponding to a region of the screen having the cursor located thereon may be recorded or reservation-recorded.

Here, the display unit may display channel guide information about a channel corresponding to the region of the screen having the cursor located thereon.

Here, the controller may be further configured to perform a video recording function and/or a reservation-video recording function with respect to an image received through a channel corresponding to a region of the screen having the cursor located thereon. And, the memory may store the recorded or reservation-recorded images.

According to another embodiment, the present invention provides a channel information display method of an image display apparatus including a screen and a storage unit, the method comprising: displaying an image from a selected channel on at least one region of the screen; sequentially receiving, by a tuner, images from a plurality of channels; storing the received images in the storage unit; and displaying the stored images from the plurality of channels simultaneously on at least multiple regions of the screen in response to a channel information function.

According to another embodiment, the present invention provides an image display apparatus comprising: a first tuner configured to receive an image from a selected channel; a second tuner configured to sequentially receive images from a plurality of channels; a storage unit configured to store the images received by the second tuner; a display unit including a screen; and a controller configured to control the display unit to display the image received from the first tuner on at least one region of the screen, the controller further configured to control the display unit to display the stored images from the plurality of channels simultaneously on at least multiple regions of the screen in response to a channel information function.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Description will now be given in detail of preferred embodiments of the present invention, with reference to the accompanying drawings.

Hereinafter, an image display apparatus according to various embodiments of the present invention will be explained with reference to the attached drawings.

Preferably, the same or similar reference numerals will be given to the same or similar parts in the present disclosure, and the explanations of the same reference numerals will not be repeated.

Figure 1:
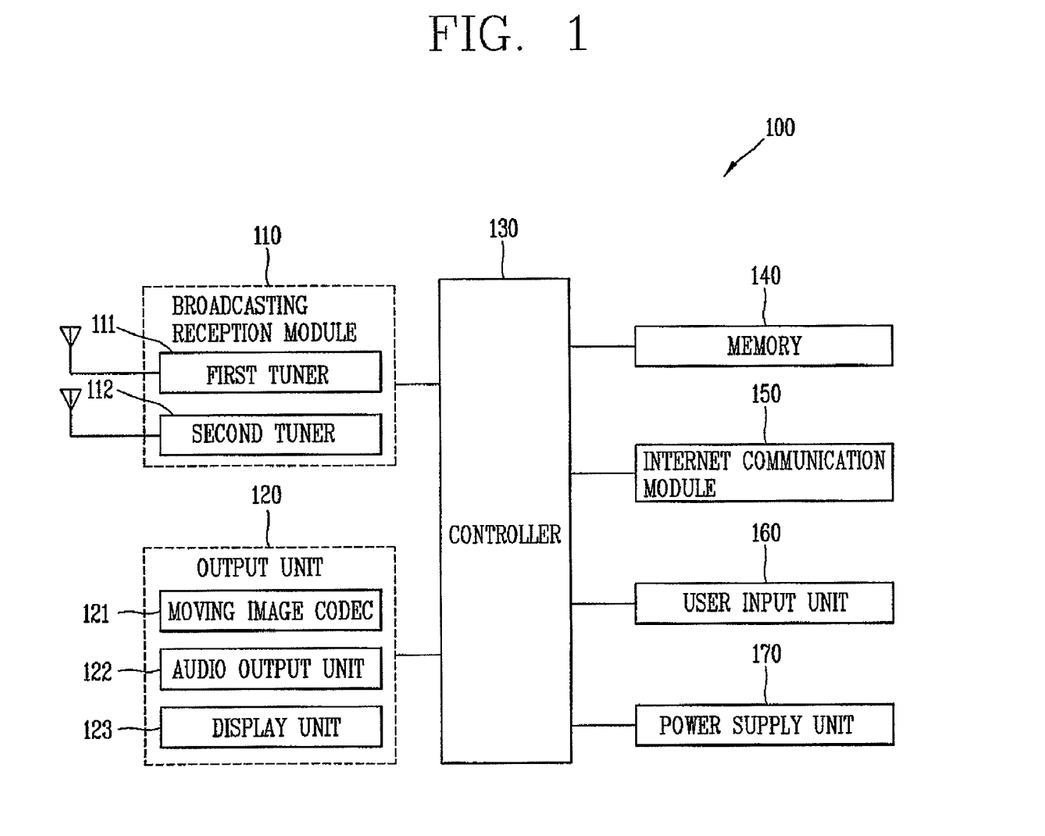
FIG. 1 is a block diagram of an image display apparatus according to one embodiment of the present invention.

FIG. 1 is a block diagram of an image display apparatus according to one embodiment of the present invention.

Referring to FIG. 1, the image display apparatus 100 may include a broadcasting reception module 110, an output unit 120, a controller 130, a memory or storage unit 140, an Internet communication module or network communication module 150, a user input unit 160, and a power supply unit 170. All components of the image display apparatus 100 are operatively coupled and configured. Here, the image display apparatus 100 may be implemented by components less or more than the components shown in FIG. 1. For instance, the image display apparatus 100 may include additional components which may be known, e.g., a camera module.

Hereinafter, the components of the image display apparatus 100 will be explained in more detail.

The broadcasting reception module 110 receives broadcasting signals and/or broadcasting related information from outside through broadcasting channels. The broadcasting reception module may include one or more tuners 111 and 112. Although FIG. 1 shows two tuners, any number of tuners may be used.

The broadcasting channels may include satellite or terrestrial wave channels, cable channels, or any other type of channels.

The broadcasting signals may include not only TV broadcasting signals (e.g., DTV signals), radio broadcasting signals, and data broadcasting signals, but may include also broadcasting signals implemented by combining the data broadcasting signals to the TV or radio broadcasting signals.

The broadcasting related information may include information about broadcasting channels, broadcasting programs and/or a broadcasting service provider. The broadcasting related information may be provided through an Internet network or other communication network such as 3G network or other mobile network. In this case, the broadcasting related information may be received by the network communication module 150.

The broadcasting related information may be implemented in various manners, such as Digital Multimedia Broadcasting (DMB), Electronic Program Guide (EPG), or Electronic Service Guide (ESG) of Digital Video Broadcast-Handheld (DVB-H).

The broadcasting reception module 110 may receive digital broadcasting signals through digital broadcasting systems, such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). The broadcasting reception module 110 may be configured to be suitable not only for the digital broadcasting systems, but also for other types of broadcasting systems.

The broadcasting signals and/or broadcasting related information received through the broadcasting reception module 110 and/or the network communication module 150 may be stored in the memory 140 or any other storage unit (e.g., removable memory card) associated with the apparatus 100.

Each of the first and second tuners 111 and 112 of the broadcasting reception module 110 may receive broadcasting signals within a specific frequency bandwidth, and then convert them into signals within an Intermediate Frequency (IF) bandwidth. Here, each of the first and second tuners 111 and 112 may tune to one or more different channels and receive images (e.g., programs, advertisements, data, etc.) of those channels. Herein below, such tuning operation may also be referred to as receiving images through those channels. In an embodiment, the first tuner 111 tunes to a single channel, whereas the second tuner 112 tunes to one or more channels.

The output unit 120 serves to output audio signals and/or video signals, and may include at least one of a moving image codec 121, an audio output unit 122, and a display unit 123.

The moving image codec 121 may represent software or an apparatus for converting voice or video data into data that can be processed by the controller 130, and then reproducing the converted data to the output unit 120 so that a user can notice.

The moving image codec 121 may encode/decode various types of data, such as Audio Video Interleaved (AVI), Motion Picture Expert Group (MPEG), DivX, XviD, and Windows Media Video codec (WMV).

The audio output unit 122 converts data decoded by the moving image codec 121 into audio data, and outputs the converted data. The audio output unit 122 may output not only data decoded by the moving image codec 121, but also audio data pre-stored in the memory 140, audio data received through the Internet communication module 150, and audio data received through the user input unit 160.

The audio output unit 122 may include one or more of a dynamic speaker, an electrostatic speaker, and a planar-magnetic speaker.

The display unit 123 outputs information processed by the image display apparatus 100 visually. For instance, when the image display apparatus 100 is in a moving image mode, the display unit 123 outputs moving images. Alternatively, when the image display apparatus 100 is in an Internet (or other network) communication mode, the display unit 123 displays User Interface (UI) or Graphic User Interface (GUI) relating to the Internet/network communication. The display unit 123 may be implemented as one or more of a liquid crystal display (LCD), a thin film transistor-liquid crystal display (TFT-LCD), an organic light-emitting diode (OLED), a flexible display, a 3D display, a plasma display panel (PDP), and a multi-display tube (MDT). The display unit 123 may include one or more screens.

The controller 130 controls the entire operation of the image display apparatus 100. For instance, the controller 130 processes received data or data stored in the memory 140 through the Internet communication module 150 and the broadcasting reception module 110. To this end, the controller 130 may include a Digital Signal Processor (DSP).

The memory 140 may store programs controlled and processed under control of the controller 130, and may temporarily store input/output data (e.g., phone book, address book, messages, still images, and moving images). The memory 140 may be implemented as one or more of flash memory type, hard disk type, multimedia card micro type, card type (e.g., SIM, SD or XD), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, magnetic disk, and optical disk. The image display apparatus 100 may operate a web storage that performs a storage function by the memory 140 on the Internet. For instance, data and information processed by the apparatus 100 may be uploaded and stored on a network entity (e.g., website), through the Internet or other network.

The Internet communication module (or network communication module) 150 is a module for transmitting/receiving data by being connected to a network through an Internet protocol or other communication protocols. The image display apparatus 100 may be wiredly or wirelessly connected to a network. Here, wireless Internet techniques, which may be incorporated in the apparatus 100, may include Wireless Lan (Wi-Fi), Wireless Broadband (Wibro), World Interoperability for Microwave Access (Wimax), High Speed Downlink Packer Access (HSDPA), etc.

Wired Internet techniques, which may be incorporated in the apparatus 100, may include Very high rate Digital Subscriber Lines (VDSL), Asymmetric Digital Subscriber Line (ADSL), High bit-rate DSL (HDSL), ISDN digital Subscriber Line (IDSL), consumer Digital Subscriber Line (CDSL), G.Lite, Rate-Adaptive Digital Subscriber Line (RADSL), Symmetric Digital Subscriber Line (SDSL), Unidirectional DSL (UDSL), Fiber-To-The-Home (FTTH), Fiber-To-The-Curb (FTTC), Hybrid Fiber Coax, and Ethernet.

The user input unit 160 can receive signals to control the operation of the image display apparatus 100. The signals to control the operation of the image display apparatus 100 may include signals to indicate operations to control moving images being currently reproduced, such as Rewind, Fast-Forward, Pause, and Record. The signals may indicate operations of the image display apparatus 100, such as power On/Off, reservation-video recording, Enable/Disable for Internet communication module, Enable/Disable for short-range wireless communications module, broadcasting channel change function, volume control function, and mute function. Not only signals to control the image display apparatus 100, but also audio data and/or image data may be input by a user to the user input unit 160 through a keyboard, keypad, stylus, touch pad, touch sensitive screen, camera, microphone, etc.

These signals may be directly input to the user input unit 160 by a user, or may be indirectly input by using a wire/wireless remote controller.

The power supply unit 170 receives external power or internal power under control of the controller 130, thereby supplying the power to each component of the apparatus 100.

In addition, the various embodiments of the present invention may be implemented in a computer-readable medium using, for example, computer software, hardware, or some combination thereof.

For a hardware implementation, the embodiments described in the present disclosure may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in a memory (for example, the memory 140), and executed by a controller or processor (for example, the controller 130).

The image display apparatus 100 can be, e.g., a DTV, an MP3 player, a computer, a mobile terminal, a handset, a user equipment, a PDA, etc.

As shown in FIG. 1, the first tuner 111 receives an image through a channel selected by, e.g., a user using a remote controller or other input unit. The selected channel here indicates a main channel for viewing which is selected by a user through the image display apparatus. For example, in response to the user's selection of a particular channel, the first tuner 111 may tune to that particular channel. And broadcasting signals of the channel selected and tuned to by the first tuner 111 are processed by the controller 130, and are output through the output unit 120.

For instance, the first tuner 111 may receive an image from a channel corresponding to a region/portion of a screen of the display unit 123 having a cursor located on that region.

As shown in FIG. 1, while an image received by the first tuner 111 is displayed by the output unit 120, the second tuner 112 sequentially receives images through one or more channels. Here, the one or more channels that are tuned to by the second tuner 112 may or may not include the channel being currently tuned to by the first tuner 111.

The second tuner 112 is differently operated according to the number of channels through which images are being currently received.

When receiving an image through one channel, the second tuner 112 continuously receives an image through that one channel. When receiving images through a plurality of channels, the second tuner 112 sequentially receives images through those plurality of channels. This causes images received by the second tuner 112 to be changed according to lapses of time. The images and other data received by the first and second tuners 111 and 112 are managed by the controller 130. Preferably, images and data from the second tuner are stored in the memory 140 for subsequent use and reproduction, whereas images and data from the first tuner are reproduced directly through the output unit 120. However, other variations are possible and part of the present invention.

As shown in FIG. 1, a channel information function may be selected by a user, e.g., using the user input unit 160. The channel information function may allow displaying images from multiple channels simultaneously on one or more regions of the screen of the display unit 123. For instance, once the channel information function is executed, the controller 130 controls the display unit 123 to display the stored images on one or more regions of the screen of the display unit 123. The screen of the display unit 123 may be divided into different regions for respectively displaying images from multiple channels simultaneously. Here, these regions of the screen may be in a form of certain shape or configuration, e.g., a 3-dimensional cube or ball, etc.

The controller 130 may control the screen for displaying the stored images at one or more regions of the screen to be arranged in a two or three-dimensional manner, or may control the regions of the screen for displaying images received through predetermined similar channels so as to be arranged with an adjacent status with one another. And, the controller 130 may display a cursor on one or more of the regions of the screen for displaying the stored images. As a variations, instead of having different regions of a single screen displaying the images respectively, it may be possible for the apparatus 100 have multiple separate screens that function like the different regions of a single screen.

The controller 130 may also control the display unit 123 to display channel guide information about the channels through which the stored images have been received by the broadcasting reception module 110.

The channel guide information may include any information pertaining to program/data of a corresponding channel, and may include, e.g., program related information such as running time, synopsis, ratings, and main character information of a program to be broadcast on a corresponding channel, etc.

The controller 130 may control the display unit 123 to display an image received by the first tuner 111 on the screen having the cursor located thereon. The controller 130 may increase a ratio of time taken to receive an image through a corresponding channel, with respect to time taken to receive images through all channels.

The controller 130 may perform a video recording function or a reservation-video recording function with respect to images received through one or more channels among the images displayed on the display unit 123. The video recording function may be a function to store images received through the broadcasting reception module 110 and broadcast through one or more channels, into a storage medium. The storage medium may include the memory 140, Blue-ray disc, Digital Video Disc (DVD), High Definition DVD (HD DVD), magnetic memory, magnetic disc, optical disc, etc.

The reservation video recording function may be a function to store images received through the broadcasting reception module 110 for a preset time and broadcast through one or more channels, into a storage medium. Here, the preset time may be set by a user. The user may directly set starting time and ending time for the reservation video recording function. Alternatively, once a broadcasting program to be reservation video-recorded is selected, the user may set starting time and ending time of the selected broadcasting program as starting time and ending time for the reservation video recording function. The image display apparatus 100 may perform other recording/reproduction functions.

The controller 113 may control the display unit 113 to display channel guide information about a channel corresponding to a screen (when multiple screens are used) or to a region of a screen (when multiple regions of a single screen are used) having a cursor located thereon.

The controller 113 may perform a video recording function or a reservation-video recording function with respect to an image received through a channel corresponding to the region/screen having a cursor located thereon.

As shown in FIG. 1, the memory 140 may store images received by the second tuner 112. The images stored in the memory 140 may be deleted as a certain time lapses. Here, the images stored in the memory 140 may be deleted in a firstly stored order inside the memory 140. For instance, the images and data stored in the memory 140 may be deleted in the order of storage in the memory 140.

The memory 140 may store images or data recorded when performing a video recording function or a reservation video recording function.

Figure 2:
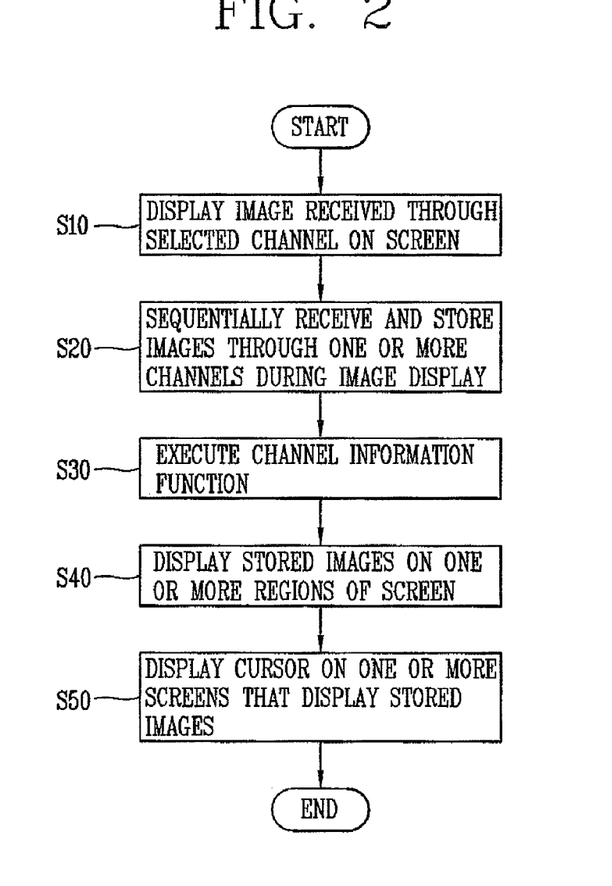
FIG. 2 is a flowchart showing a channel information display method of an image display apparatus according to an embodiment of the present invention.

FIG. 2 is a flowchart for explaining a channel information display method of an image display apparatus according to a first embodiment of the present invention. This method implemented in the apparatus 100 of FIG. 1 is discussed below; however, the method may be implemented in other suitable device. In the present and other embodiments, an 'image' may include video and/or audio data including one or more of moving images, programs, data, etc.

Referring to FIG. 2, the first tuner 111 receives an image through a first selected channel, and the display unit 123 displays the image of the first selected channel on a screen of the display unit 123 (S10). During the image display (e.g., while the image from the first selected channel is continuously displayed on the entire screen of the display unit 123), the image display apparatus 100 may sequentially receive images through one or more channels to store them (S20). For instance, the second tuner 112 sequentially receives images from one or more channels for storage in the memory 140.

Once a user selects a channel information function using the user input unit 160, the controller 130 executes the channel information function (S30). To execute the channel information function, the controller 130 controls the display unit 123 to display the stored images on one or more regions of the screen of the display unit 123 (S40).

When the stored images (e.g., images tuned by the second tuner) are displayed on the entire screen, the image received through the first selected channel may not be displayed on the screen. On the other hand, while the stored images are displayed on certain regions of the screen, the image received through the first selected channel may be displayed on another region of the screen together with the stored images. That is, images from different channels may be simultaneously and continuously displayed on different regions of the screen, where these images are moving images. For instance, programs (e.g., TV programs, movies, shows, etc.) that are broadcast by broadcasters and other entities on different channels may be received, stored and reproduced on the screen as they are.

The stored images may be displayed as being arranged in a two- or three-dimensional manner. For instance, the regions of the screen (or the screens) for displaying the stored images may be formed in polygonal shapes. In an example, similar channels or channels providing similar images or programs may be displayed adjacent to each other. For instance, the regions of the screen (or the screens) for displaying images received through predetermined similar channels may be arranged to be adjacent to one another. The predetermined similar channels may indicate a set of channels classified as similar channels by a broadcasting provider or a user. The user may group certain channels into different groups (e.g., movie channel group, news channel group, etc.) and such groups of channels may be displayed at different locations of the screen. For example, if the regions of the screen for simultaneously displaying the multiple channels of moving images are represented in a cube-shape, one side of the cube on the screen may display the movie channel group (movie channels), where another side of the cube on the screen may display the news channel group (news channels), etc.

A cursor may be displayed on one or more regions of the screen (or the screens) (S50). For instance, the user may be able to move the cursor location from one region to another region of the screen where the images are displayed. By placing the cursor on a region or activating the cursor on the region of the screen (e.g., by pressing a button), the channel displayed on the cursor-identified region may be selected and activated, whereby that channel may be displayed on the entire screen (e.g., without any other channels being displayed) or on a larger region of the screen.

Once the channel corresponding to the screen/region having the cursor located thereon is activated, the first tuner 111 or the second tuner 112 may tune to the activated channel, and display the received image from the activated channel on the screen.

The region of the screen having the cursor located thereon may have its size gradually increased with respect to the entire screen size as time lapses. For instance, an image displayed on such region may be gradually enlarged as time lapses since that region is selected (e.g., by the cursor). When a preset time lapses under a state the cursor is displayed or located on one region of the screen, the channel corresponding to the region having the cursor located thereon may be set as a main channel. Here, the main channel indicates a channel received by the first tuner 11, and displayed on the screen by the display unit 123 when a channel information function is not executed. For instance, when the cursor is used on the screen to select a particular channel, the first tuner 111 may switch from a currently tuned channel to the channel corresponding to the cursor-selected region of the screen. And the images from that channel as received by the first tuner 111 may be displayed on the entire screen or a main region of the screen for displaying images received by the first tuner 111.

While the second tuner 112 receives images through a plurality of different channels sequentially, the controller 130 may increase a ratio of time taken to receive an image through a channel corresponding to the screen having the cursor located thereon, with respect to time taken to receive images through all other channels. For instance, if a cursor is located over a region D of the screen, then as the second tuner 112 sequentially tunes to each of the different channel for a preset time period, the second tuner 112 may tune to a channel corresponding to the region D much longer than all other channels.

Figure 3:
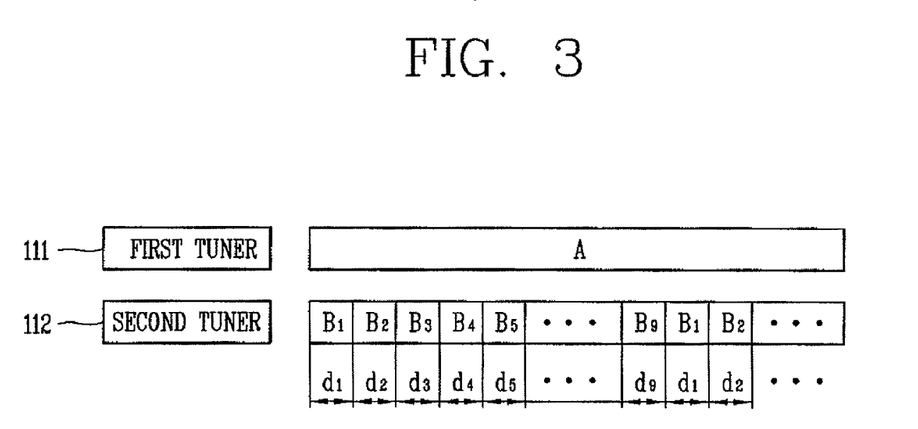
FIG. 3 is an example of a conceptual view of signals being tuned by first and second tuners, for explaining a method for sequentially receiving images through a plurality of channels by a second tuner and storing the images while displaying a selected channel according to an embodiment of the present invention.

FIG. 3 is an example of a conceptual view for explaining a method for sequentially receiving images through a plurality of channels by a second tuner and storing the images while displaying a selected channel according to an embodiment of the invention.

Sequentially receiving images by the second tuner 112 through a plurality of channels may include receiving images within a preset time through one channel among a plurality of channels, and then after the preset time lapses, receiving images within a preset time through another channel among the plurality of channel, and then so on to the next channel. Here, the preset times for all channels may be the same or vary.

In the example of FIG. 3, the first tuner 111 consecutively receives an image through a selected channel (A). The selected channel (A) may signify a main channel. The channel (A) selected by the first tuner 111 may be displayed on a screen of the display unit 123. Meanwhile, the second tuner 112 may sequentially receive images from each of multiple channels (B1-B9).

More specifically, while an image received through the channel (A) selected by the first tuner 111 is displayed on the screen, the second tuner 112 sequentially receives images through a plurality of channels (B1~B9). FIG. 3 shows 9 channels; however, the number of channels may be varied according to a set status and the present invention covers any number of channels for the second tuner 112. In one example, the plurality of channels (B1~B9) may include the selected channel (A) if desired, but in another example, the plurality of channels tuned to by the second tuner may be different from the channel tuned by the first tuner.

The second tuner 112 receives an image through a first channel (B1) among the plurality of channels (B1~B9) for a first preset time (d1), and the received images from the first channel (B1) are stored in the memory 140. Once the first preset time (d1) lapses, then the second tuner 112 receives an image through a second channel (B2) for a second preset time (d2), and the received images from the second channel (B2) are stored in the memory 140.

In the same manner, the second tuner 112 receives images through each of the other channels (B3~B9) for each of the preset times (d3~d9) respectively and the received images from these channels are stored in the memory 140. Once the second tuner 112 receives an image through the ninth channel (B9) for the ninth preset time (d9), the second tuner 112 may again receive an image through the first channel (B1) for the preset time (d1). The second tuner 112 may sequentially receive images through the first to ninth channels (B1~B9), which may be repeatedly performed.

Accordingly, the stored images from each channel for each preset time would be displayed respectively on different regions of the screen, simultaneously.

The first to ninth preset times (d1~d9) may be set to have the same duration, or may be differently set according to a set status by a user or the controller 130, or a broadcasting reception status, etc.

The images sequentially received by the second tuner 112 through each of the plurality of channels (B1~B9) are stored in the memory 140. The images sequentially received by the second tuner 112 through the plurality of channels (B1~B9) may be stored in the memory 140 in an updated manner. The images stored in the memory 140 may be deleted as a preset time lapses. Here, the images stored in the memory 140 may be deleted in a firstly stored order in the memory 140, or according to a user's preset order.

The second tuner 112 may tune to a single channel at a time such that it can tune to each of the multiple channels sequentially. In a variation, the second tuner 112 may be able to tune to multiple channels simultaneously.

FIGS. 4A to 4D are different examples of a screen of an image display apparatus in a channel information function mode according to an embodiment of the present invention.

Figure 4A:
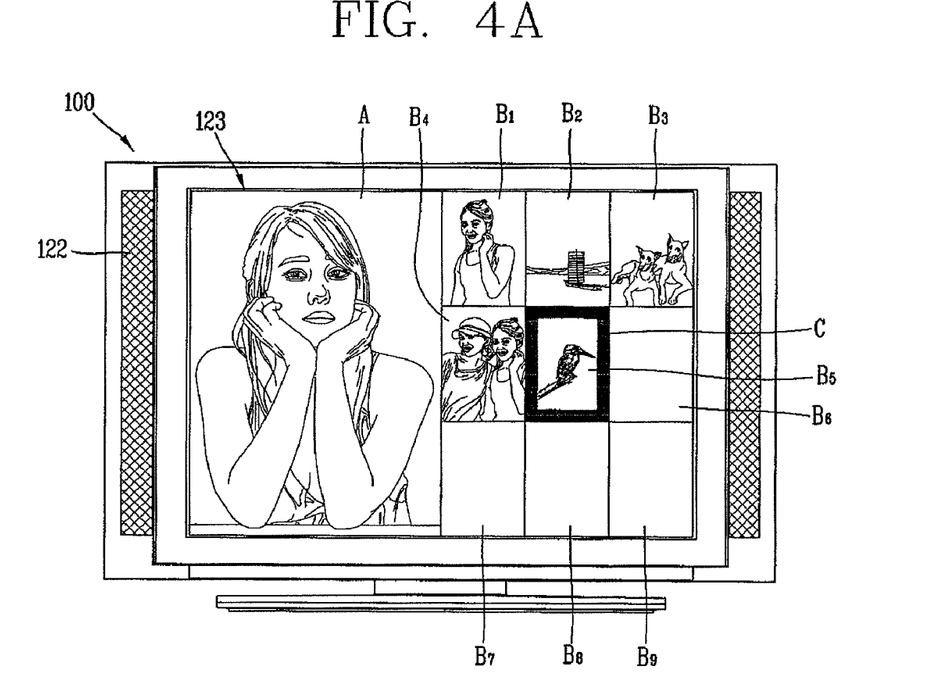
FIGS. 4A to 4D are different examples of images displayed on regions of a screen of an image display apparatus in response to a channel information function according to an embodiment of the present invention.

In a normal operation mode, a user may be viewing images from a single channel (e.g., channel (A) tuned to by the first tuner) on the entire screen of an image display apparatus. Then the user may select a channel information function mode, e.g., using the user input unit 160. In the channel information function mode, images tuned to by the second tuner and stored in the memory 140 are displayed on one or more regions of the screen.

For instance, as shown in FIG. 4A, images sequentially received through the plurality of channels (B1~B9) and stored in the memory 140 may be displayed on a screen of the display unit 123 together with an image received through the selected channel (A). In this example, the screen is divided visually (but not necessarily physically) such that the program of the channel A is displayed on one region of the screen while the programs (stored images) of the other channels (B1-B9) are displayed on the other regions of the screen. As a result, the user can view all 10 channels (A and B1-B9) simultaneously. Here, it should be clearly understood that all images (including the stored images) displayed on the screen are moving images although the images may include static data/pictures. If the channels A and B1-B9 are showing different movies, then the screen would be showing these 10 movies simultaneously through the different regions of the screen. In this regard, while the program of the channel A may be continuously displayed on one region of the screen since the first tuner continuously tunes to the channel A, the programs from the other channels B1-B9 may be displayed with certain portions thereof being skipped since the second tuner only sequentially tunes through the channels B1-B9 as shown in FIG. 3. The user can regardless view the programs (parts thereof) of these channels B1-B9 and decide to select one of these channels for main viewing (e.g., to be displayed on the entire screen) if desired.

As shown in FIG. 4A, a cursor (C) may be displayed on at least one region (showing the channel B5) of the screen. The position of the cursor (C) may be varied by a user's manipulation through the user input unit 160. The user input unit 160 may be provided at the image display apparatus, or may be implemented as a remote controller. For instance, a user may select a menu item or button (or perform some other act) to display a cursor, and may move the cursor to a region of the screen that is displaying a desired channel. The user may select a menu item or button (or perform some other act) to activate the cursor on the desired region, which in turn may cause the corresponding channel to be displayed for main viewing or may cause some other operation.

In order to vary the position of the cursor (C) through the user input unit 160, the user input unit 160 may be provided with buttons indicated by arrows or jog dials.

For instance, as shown in FIG. 4A, under a state that the cursor (C) is disposed on a region of the screen for displaying an image of one channel (channel B5) among the plurality of channels (B1~B9), when a user presses a button, e.g., up arrow (↑), the cursor (C) may be moved upwardly and then displayed on a region of the screen for displaying an image of another channel B2.

Figure 4B:
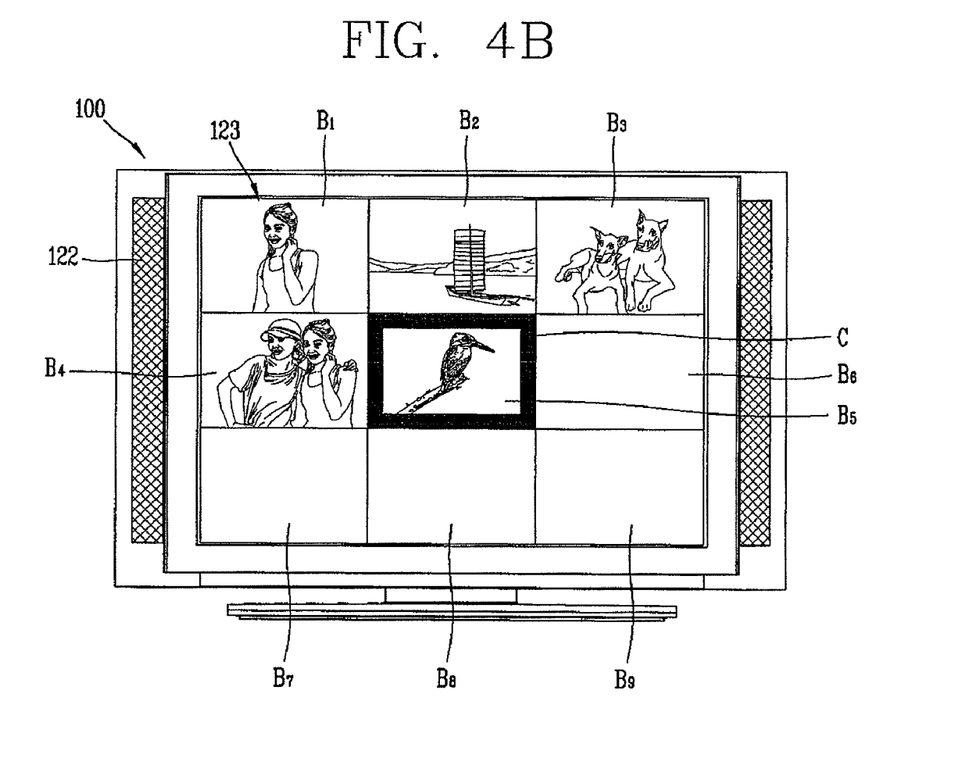

In another example as shown in FIG. 4B, under a state that a channel information function (or other designated function) is selected, only images sequentially received through the plurality of channels (B1~B9) and stored in the memory 140 may be reproduced and displayed on the screen. That is, the images from the channels B1-B9 that are displayed on the screen are stored moving images.

As shown in FIGS. 4A and 4B, the images sequentially received through the plurality of channels (B1~B9) and stored in the memory 140 may be arranged in a two-dimensional manner. The regions of screen for displaying the stored images may be implemented so that these regions for displaying images received through predetermined similar channels are arranged to be adjacent to one another. The predetermined similar channels can indicate a set of channels classified as similar channels by a broadcasting provider or a user.

For instance, when a user classifies cinema channels as main channels, the cinema channels are arranged to be adjacent to one another when a channel information function is executed. The classification may be performed by a broadcasting provider or the controller 130.

Figure 4C:
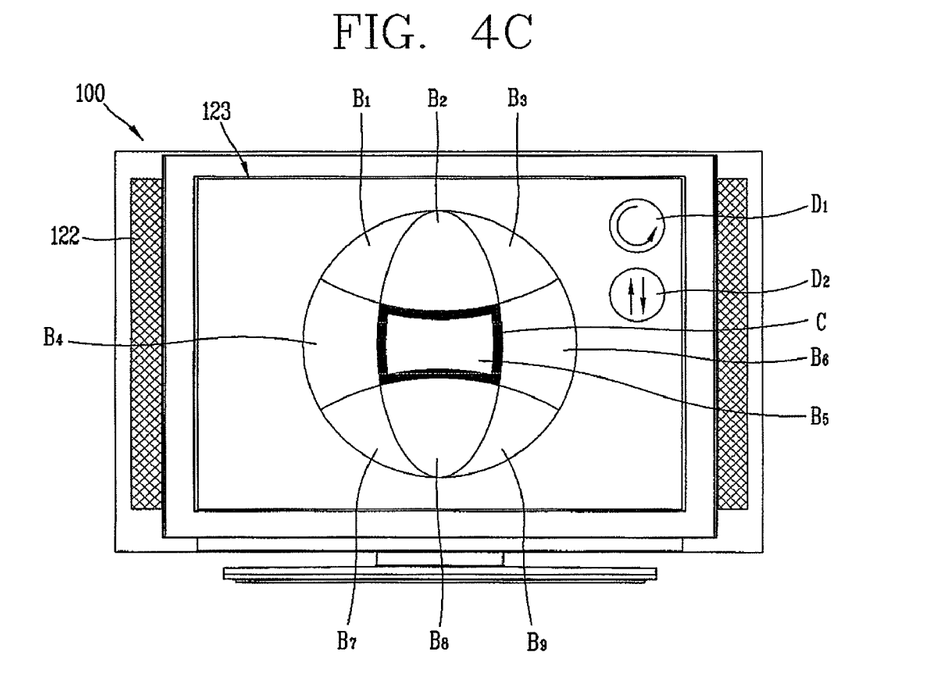
Figure 4D:
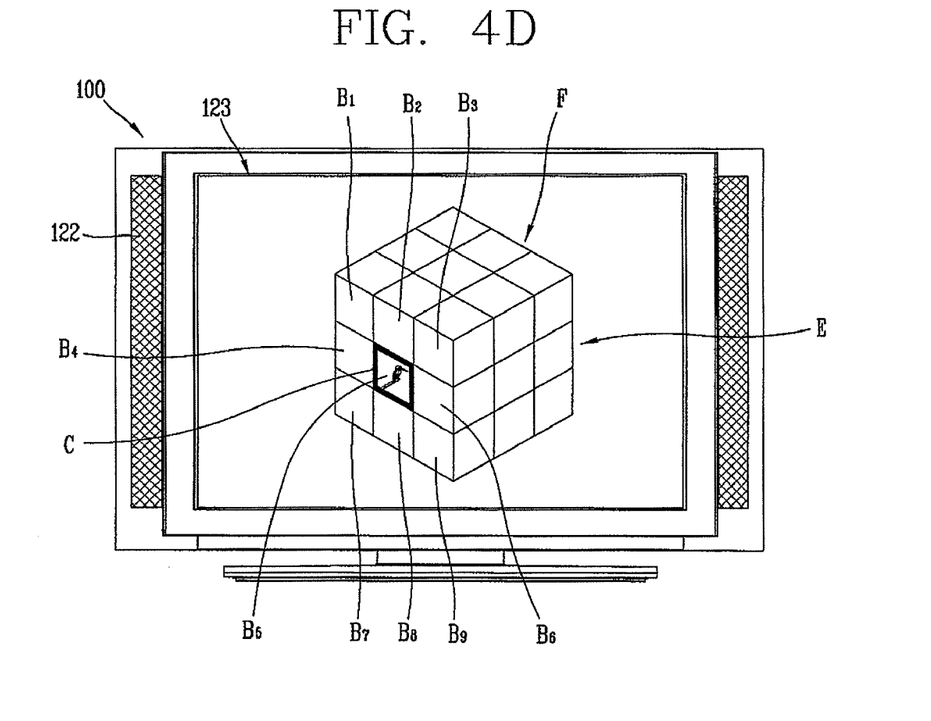

As shown in FIGS. 4C and 4D, the images sequentially received through the plurality of channels (B1~B9) and stored in the memory 140 may be arranged in a three-dimensional manner on the screen of the apparatus 100.

As shown in FIG. 4C, the images sequentially received through the plurality of channels (B1~B9) and stored in the memory 140 may be arranged on a surface of a sphere. When the images sequentially received through the plurality of channels (B1~B9) and stored in the memory 140 are reproduced on the screen in a three-dimensional shape (e.g., sphere), manipulation icons D1 and D2 for manipulating the three-dimensional shape may be additionally displayed on the screen.

As shown in FIG. 4C, once the user manipulates the first manipulation icon D1, the sphere currently displaying the channel B1-B9 on the screen may be rotated in a first axis direction and then displayed. In that case, other channels (e.g., channels C1-C9) which may be assigned to the other side of the sphere, may then be displayed on the screen due to the rotation of the sphere. As a result, not only the images sequentially received through the plurality of channels (B1~B9) may be displayed on the screen, but also other images from other channels may be displayed on the screen. Accordingly, a large number of different channels may be easily manipulated on the screen and viewed by the user. Further, these channels can be grouped depending on similarity or other common features, and can be displayed in groups. For instance, in the above example, the channels B1-B9 may be movie channels grouped by a user, and the channels C1-C9 may be news channels grouped by the user. By a single act of manipulating the icon D1, the user may view all of the user's favorite movie channels (displayed on one side of the sphere) and then all of the user's favorite new channels (displayed on the other side of the sphere).

Once a user manipulates the second manipulation icon D2, the sphere displayed on the screen may be rotated in a second axis direction and then displayed. The first axis and the second axis may be disposed to be perpendicular to each other. Varying degrees of rotation by the first and second manipulation icons D1 and D2 are possible.

In another example, as shown in FIG. 4D, the images sequentially received through the plurality of channels (B1~B9) and stored in the memory 140 may be arranged on a surface of a polygonal shape, e.g., hexahedron.

Once a user manipulates the user input unit 160, different surfaces E and F of the hexahedron may be displayed on the screen. For instance, once the user selects the surface of 'E', a plurality of channels may be displayed on the surface of 'E' in a two-dimensional manner. The screen for displaying a plurality of channels on the surface of 'E' in a two-dimensional manner may be implemented as the same screen as that of FIG. 4B. Similar to the examples of FIG. 4C, the different sides of the hexahedron may represent different groups of channels. Further, manipulation icons for manipulating and rotating the hexahedron may be provided on the screen of the apparatus 100. In the examples where the channels are represented in a three-dimensional manner, a cursor C may also be provided for selecting a particular channel for main viewing or for other operation.

As shown in FIG. 4A, the controller 130 may activate a channel corresponding to a region of the screen having the cursor (C) located thereon. Under a state that the image display apparatus 100 includes two tuners 111 and 112 as shown in FIG. 1, when a channel information function is executed, images received through a selected channel (A) may be displayed as shown in FIG. 4A. Here, the images received through the selected channel (A) may not be displayed in a case of FIG. 4B.

It is assumed that an image received through the selected channel (A) is displayed when a channel information function is executed as shown in FIG. 4A. In order for the controller 130 to activate a channel corresponding to a region of the screen having the cursor (C) located thereon, one or more of the two tuners 111 and 112 have to receive images through the channel corresponding to the screen region having the cursor (C) located thereon.

In this case, the first tuner 111 that has been received an image through the selected channel (A) may switch to and receive an image through a channel corresponding to the screen region having the cursor (C) located thereon. In the example of FIG. 4A, if the cursor on the channel B5 is activated, then the screen region showing the channel A may then switch to the channel B5 and show the channel B5 continuously. On the other hand, the second tuner 112 may sequentially receive images through a plurality of channels (B1~B9) and the selected channel (A). The images through the selected channel (A) and the plurality of channels (B1~B9) are sequentially received by the second tuner 112, and are stored in the memory 140. That is, the second tuner 112 may now tune to multiple channels including the channel (A) that was previously tuned to by the first tuner, so that this channel (A) is not lost and would be displayed on some region of the screen. In that case, one of the other channels B1-B9 may be removed, e.g., the second tuner may tune to the channels A and B1-B8 such that the channel A and B1-B8 are then displayed simultaneously on the regions that previously displayed the channels B1-B9 in FIG. 4A. Alternatively, the screen may be divided to include an additional region such that the channels A and B1-B9 may be displayed simultaneously on the regions that previously displayed the channels B1-B9 in FIG. 4A.

The output unit 120 may display continuously an image continuously received through the selected channel (A) and stored in the memory 140.

Referring to FIG. 4B in this example, it is assumed that an image received (e.g., by the first tuner) through the selected channel (A) is not displayed in the activation of a channel information function. In order for the controller 130 to activate a channel corresponding to a region of the screen having the cursor (C) located thereon, one or more of the two tuners 111 and 112 may have to receive images through the channel corresponding to the region of the screen having the cursor (C) located thereon. For instance, the first tuner 111 that has been receiving an image through the selected channel (A) may now switch and receive an image through a channel corresponding to the region of the screen having the cursor (C) located thereon. This may occur in response to a user's input. At the same time, in an example, an image received through the selected channel (A) may not be displayed at all on the screen of the output unit 120 as shown in FIG. 4B. Accordingly, the selected channel (A) may not be added to the plurality of channels (B1~B9) through which the second tuner 112 sequentially receives images. The programs on the channels B1-B9 may now be displayed simultaneously on the entire screen. In an example, at this time, if a user selects a particular one (e.g., B5) of the channels B1-B9 using a cursor C as shown, then the entire screen may display only the program of the selected channel B5.

In FIGS. 4A and 4B (and other applicable figures), some (e.g., B6-B9) of the regions of a screen are shown as blank while other regions (e.g., A, B1-B5) of the screen are shown with pictures of people, animals, etc. Although some regions may be shown as blank (which is shown as such for the sake of brevity), preferably each and all of the regions of the screen are simultaneously displaying programs or other signals that were received through respective channels (e.g., broadcast channels, communication channels, etc.) corresponding to the regions of the screen.

Figure 5:
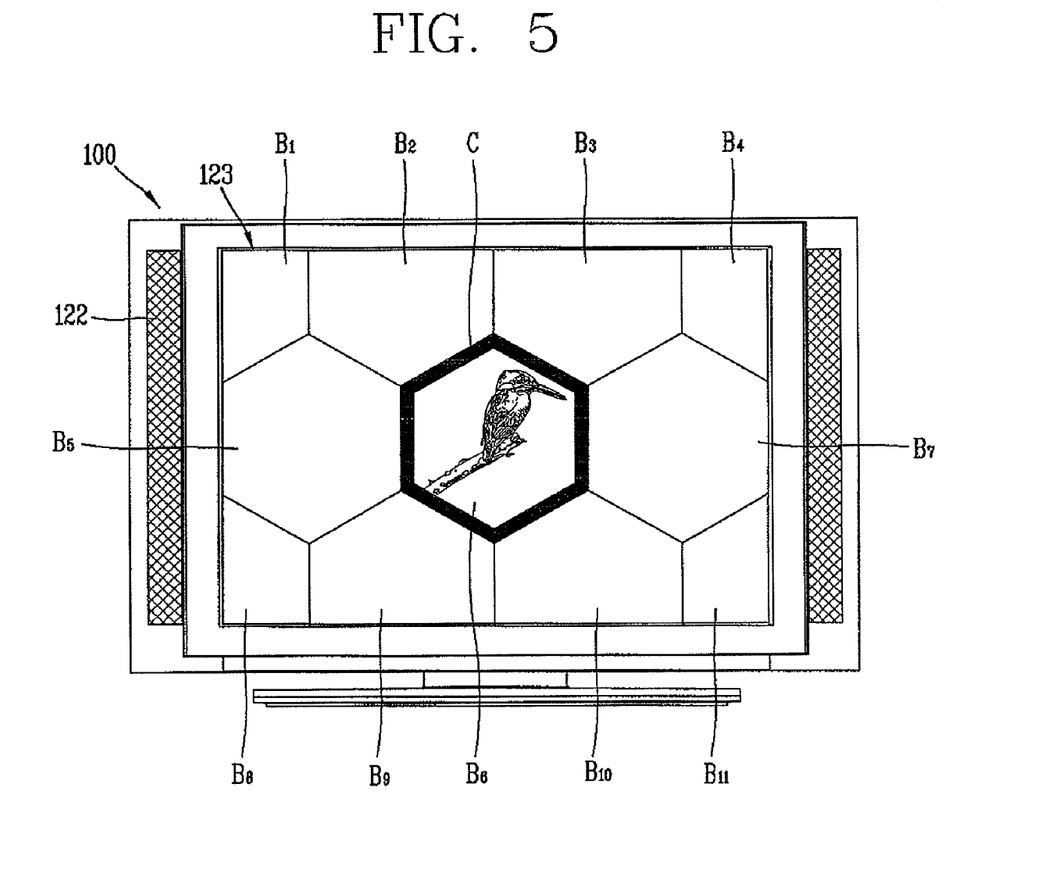
FIG. 5 is a view showing another example of regions of a screen for displaying multiple channels according to an embodiment of the present invention.

In another example of FIG. 5, regions in a screen for displaying the images sequentially received through the plurality of channels (B1~B9) and stored in the memory 140 may be formed to have a polygonal shape. Here, the polygonal shape may be a hexahedron as an example only, but can be any other shape.

It is assumed that the cursor (C) located on one region of the screen can be moved onto an adjacent region of the screen whenever the user input unit 160 is manipulated by a user. Here, the number of channels that can be selected through a single manipulation of the user input unit 160 may correspond to the number of edges of a region of the screen for displaying an image.

For instance, as shown in FIG. 5, it is assumed that each region of the screen is formed in a hexahedron shape. For example, when the user desires to move the cursor (C) currently located on the region for displaying channel B6 ha, the user has only to move the cursor (C) to the adjacent region (B2, B3, B5, B7, B9 or B10) through a single manipulation. Accordingly, the number of the regions of the screen onto which the cursor (C) can move by a user's single manipulation, in this example, is six. For this operation, the user input unit 160 may include an appropriate mechanism or device (e.g., designed menu buttons, joy stick, etc.) so that the cursor may be moved in one of six different directions.

As shown in FIG. 5, when the regions of the screen for simultaneously displaying images sequentially received through the plurality of channels are formed in hexahedron shapes, the number of channels that can be selected through one or two manipulations may be 18. As shown in FIG. 4A or 4B, when the regions of the screen for simultaneously displaying images sequentially received through the plurality of channels is formed in a rectangular shape, the number of channels that can be selected through one or two manipulations may be 13. From the above explanations, it can be inferred that the more the number of edges of the regions of the screen for displaying the plurality of channels is, the more channels can be selected through a user's manipulations.

FIGS. 6A to 6D are examples of views showing that a size of a region of a screen having a cursor located thereon can gradually increase or decrease with respect to the entire screen size according to lapses of time according to an embodiment of the present invention.

Figure 6A:
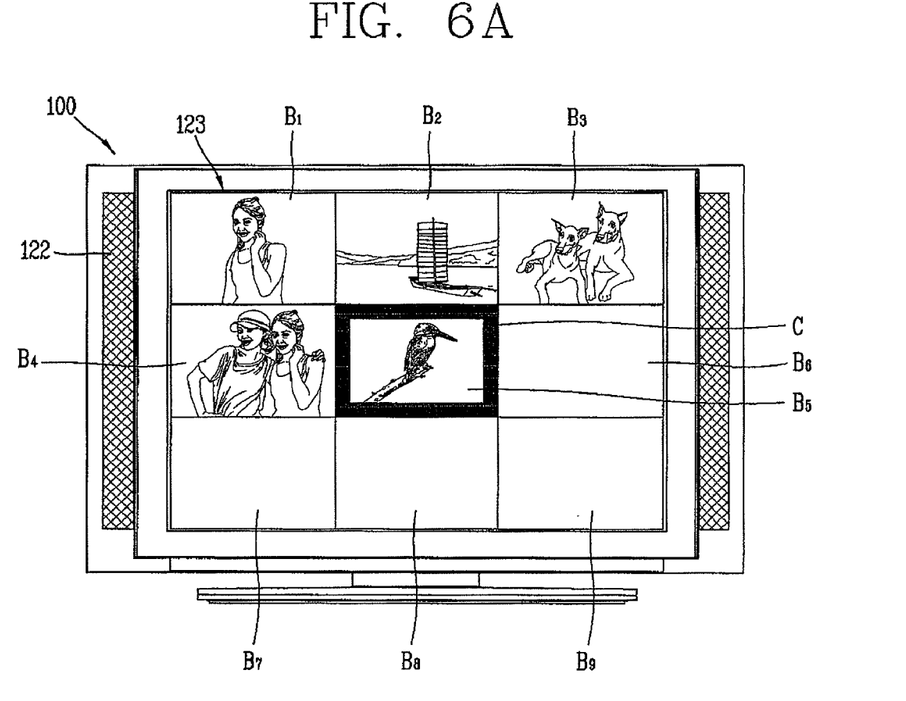
FIGS. 6A to 6D are examples of views showing that a size of a region of a screen having a cursor located thereon may gradually increase with respect to the entire screen size according to lapses of time according to an embodiment of the present invention.

As shown in FIG. 6A, once the cursor (C) is located on a region of a screen of an image display apparatus (e.g., apparatus 100) for displaying an image received through one channel (e.g., B5) among a plurality of regions of the screen for displaying simultaneously images received through the plurality of channels, the controller 130 may activate the region (i.e., channel B5) identified by the cursor (C). Here, the cursor may be placed on the region and the mere placement of the cursor may activate that region. In a variation, once the cursor is placed on the region, an additional act (e.g., additional input or activation) may be needed to activate the region. Further, in this and other examples, the cursor (C) can be represented in any manner, shape or configuration. For example, a sign or symbol representing the cursor may be placed on a corner area of a region of the screen.

Figure 6B:
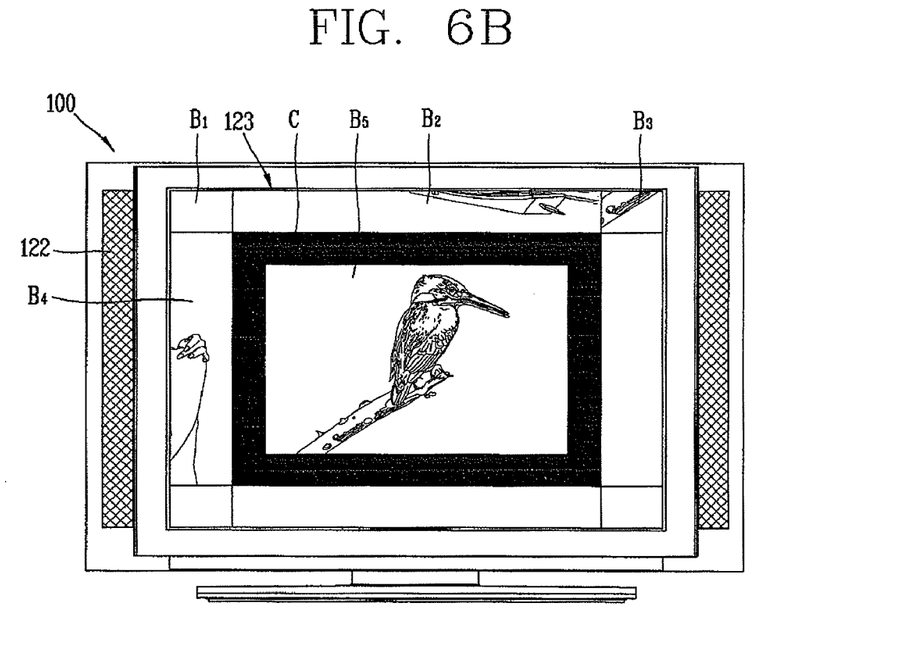

As shown in FIG. 6B, once the region (e.g., for displaying the channel B5) identified by the cursor C is activated, the size of that region may gradually increase with respect to the entire screen size according to lapses of time, or instantly increase to a large size.

Referring to FIG. 6B, in this example, the region of the screen having the cursor (C) located thereon has a size that gradually increased with respect to the entire screen size while maintaining its shape (e.g., rectangular shape). However, the region of the screen having the cursor (C) located thereon may have a size gradually increased with respect to the entire screen size in variable shapes, e.g., as the size increases, the shape of the region may also change.

As discussed above, the size of the region of the screen having the cursor (C) located thereon may immediately increase, or may increase as a certain time lapses after the cursor (C) is displayed thereon.

Figure 6C:
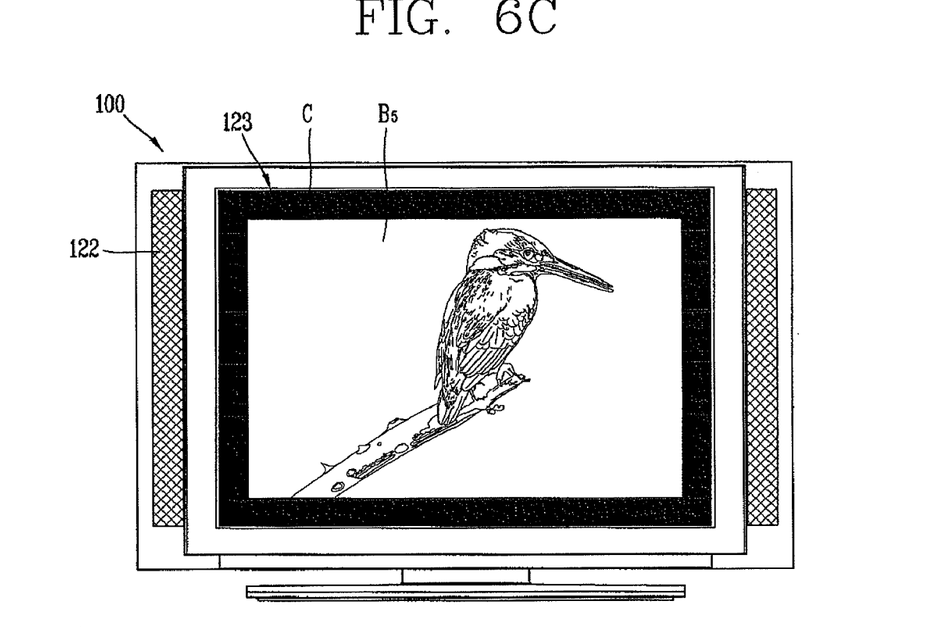

As shown in FIG. 6C, the size of the region of the screen having the cursor (C) located thereon may gradually increase with respect to the entire screen size, such that that region is fully displayed on the entire screen of the image display apparatus.

Figure 6D:
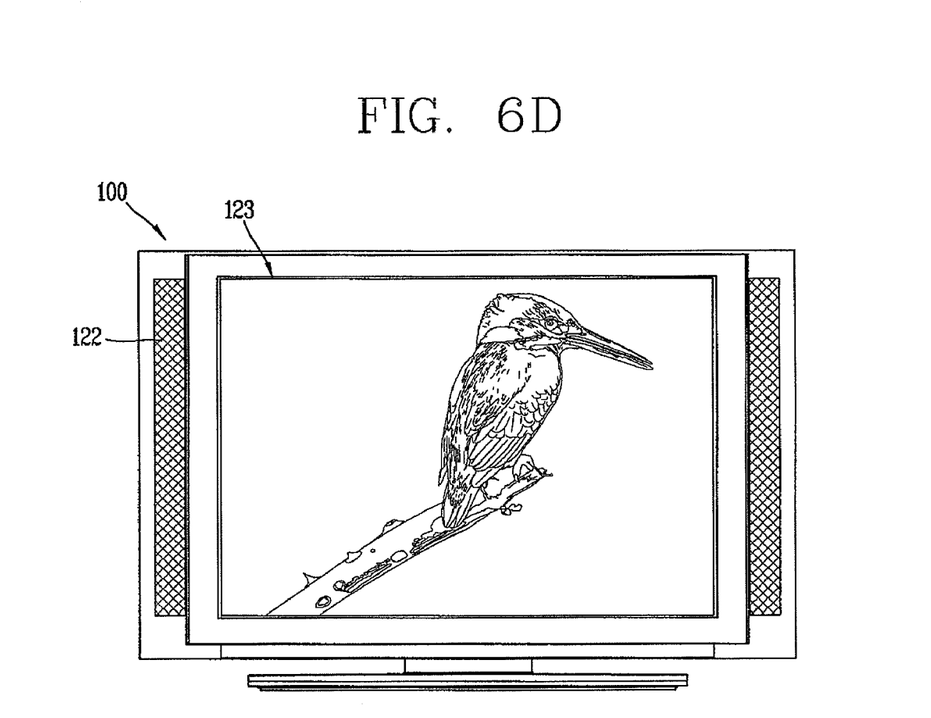

As shown in FIG. 6D, the region of the screen having the cursor (C) located thereon may be set as a main channel (A)

as a certain time lapses. This may occur automatically in the image display apparatus, or may be manually set by the user. Once the region (e.g., for displaying the channel B5) having the cursor (C) located thereon is set as a main channel, the controller 130 may treat the channel B5 as the main channel and may end the channel information function. Here, the first tuner may now tune to the channel B5 as the main channel, and the cursor may disappear.

Figure 7A:
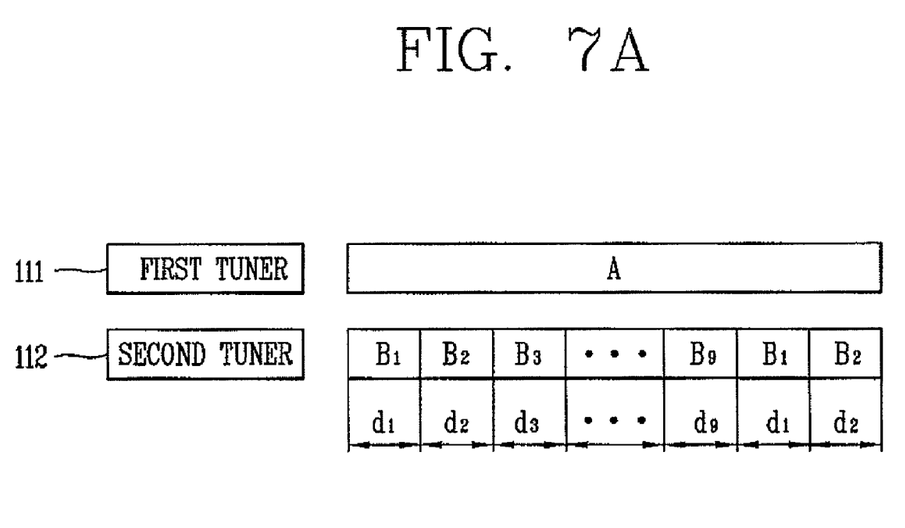
FIGS. 7A and 7B are examples of conceptual views showing that a tuned-in time duration of a tuner for one channel identified by a cursor may be different from a tuned-in time duration of the tuner for other channel(s) according to an embodiment of the present invention.
Figure 7B:
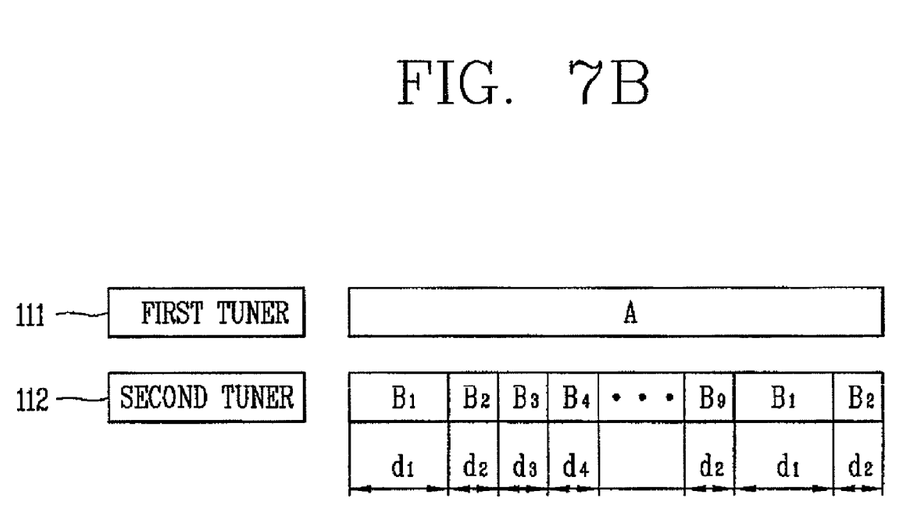

FIGS. 7A and 7B are another example of conceptual views for showing that a ratio of time taken for a second tuner to receive an image through a channel corresponding to a region of a screen having a cursor located thereon, with respect to time taken to receive images through all other channels is increased according to an embodiment of the present invention.

When images received through a plurality of channels and stored in the memory 140 are to be simultaneously displayed on the screen under activation of a channel information function, it is assumed in this example that the cursor (C) is located on a region of the screen for displaying an image received through one channel (e.g., channel B1) among a plurality of channels.

The controller 130 may vary or increase the duration of time for receiving an image through the channel B1 corresponding to the region of the screen having the cursor (C) located thereon, with respect to the duration of time for receiving images through other channels, when the second tuner 112 sequentially receives images through the plurality of channels (e.g., channels B1~B9).

More specifically, as shown in FIG. 7A, when the cursor (C) is not displayed or placed on the screen, it is assumed that each time (d1~d9) for which the second tuner 112 receives images through each channel (B1~B9) is set to have the same duration. For instance, when the cursor is not used or involved, the second tuner 112 tunes to the channel B1 for a time duration of d1, and then tune to the next channel B2 for a time duration of d2, and then tune to the next channel B3 for a time duration of d3, and then tune to the next channel B4 for a time duration of d4, and so on, where all the time durations d1, d2, d3, d4, . . . are the same or substantially the same.

On the other hand, as shown in FIG. 7B, when the cursor is used or involved, the controller 130 may increase the time duration (d1) for which an image is received through the channel B1 corresponding to the region of the screen having the cursor (C) located thereon, while decreasing the other times (d2~d9). For instance, if the cursor is located on or used to activate a particular region (e.g., for displaying channel B1), then the second tuner 112 may tune to the channel B1 for a time duration of d1, and then sequentially tune to the other channels for time durations of d2-d9, where d1 is larger than any one of d2-d9 and where d2-d9 are equal to each other.

As a variation, the user may be able to variably and independently set each of the tuning time durations (e.g., d1, d2, d3, . . . ) for each of the first and second tuners 111, 112 as desired.

Figure 8:
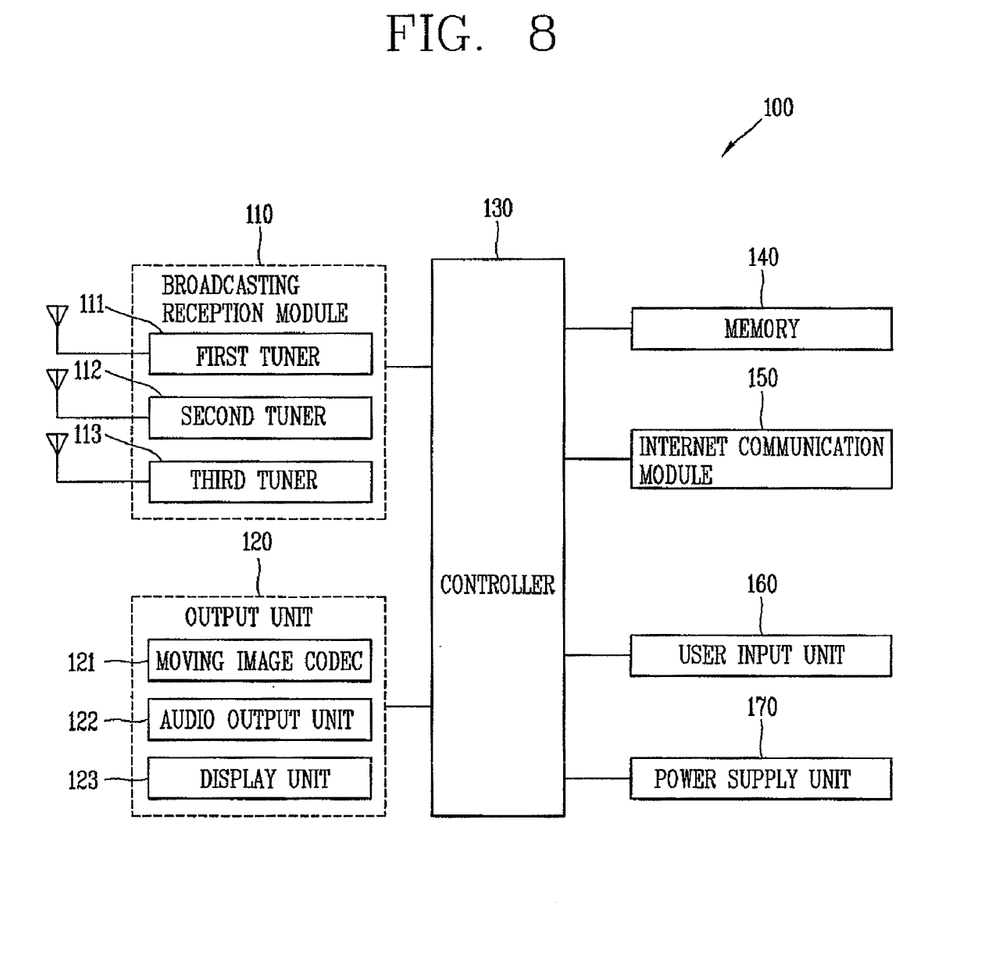
FIG. 8 is a block diagram of an image display apparatus according to another embodiment of the present invention.

FIG. 8 is a block of an image display apparatus according to another embodiment of the present invention.

As shown in FIG. 8 in this example, the image display apparatus 100 of FIG. 1 may be implemented so that the broadcasting reception module 110 can further include a third tuner 113. All components of the image display apparatus 100 of FIG. 8 are operatively coupled and configured.

The third tuner 113 may receive an image through a channel corresponding to a region of a screen having the cursor (C) located thereon. That is, a separate tuner may be provided to tune to a channel identified by the cursor on the screen of the display unit 123.

In this embodiment, in the example of FIG. 4B where the channel B5 corresponding to the region of the screen having the cursor (C) located thereon is to be activated under a state that the previously selected channel A is not displayed on the screen, the first tuner 111 may receive an image through the channel B5. Then the controller 130 may control the display unit 123 so as to display an image received by the first tuner 111 (i.e., channel B5) on the screen having the cursor (C) located thereon. As a result, the channel B5 may be displayed continuously (e.g., in real time) as it is tuned to by the first tuner 111. On the other hand, the other regions of the screen rather than the region for displaying the channel B5 having the cursor (C) located thereon may display stored images retrieved from the memory 140, which are still moving images (and not just still pictures).

In the example of FIG. 4A when the channel B5 corresponding to the region of the screen having the cursor (C) located thereon is to be activated under a state that an image received through the selected channel A is displayed on the screen, the controller 130 may control the first tuner 111 so as not to receive an image of the channel (B5), in order for the first tuner 111 to continuously receive an image through the selected channel (A) and for the display unit 123 to display the received image of the channel A on the screen while the other channels including the channel B5 are displayed at the same time.

Figure 9:
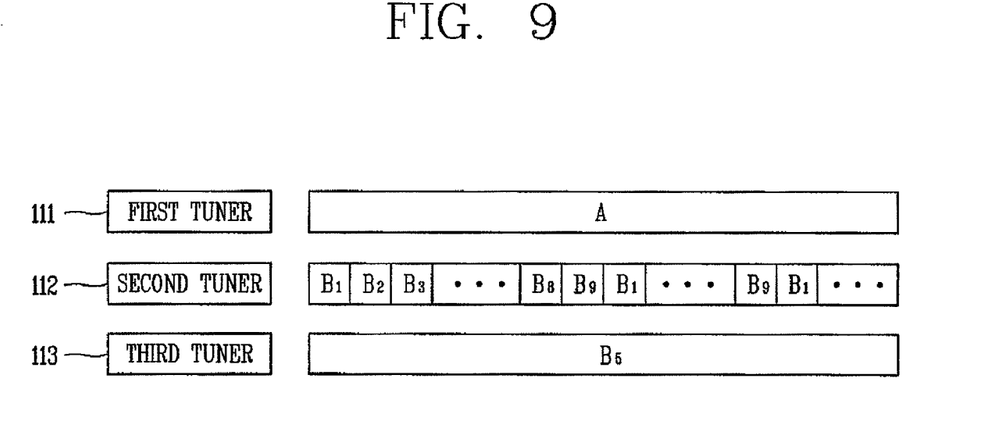
FIG. 9 is an example of a conceptual view showing that a channel identified by cursor may be tuned separately by a third tuner according to an embodiment of the present invention.

FIG. 9 is an example of a conceptual view showing a status that an image is being received through a channel corresponding to a region of a screen having a cursor located thereon according to an embodiment of the invention. For example, the third tuner may tune to a channel having a cursor located thereon so that the images of that channel may continuously be displayed directly from the third tuner.

In the example of FIG. 4A, the controller 130 may control such that the third tuner 113 receives an image through the channel B5 corresponding to the region of the screen having the cursor (C) located thereon, and the image received by the third tuner 113 is displayed on the region of the screen having the cursor (C) located thereon. For instance, the images of the channel B5 on the screen may not be the stored images from the memory 140, and may be images fed directly from the third tuner 113. As a result, the images of the channel B5 may be displayed continuously without interruptions or skipped areas. In this example, the first and second tuners 111 and 112 may operate as discussed above.

According to an embodiment, the user can select which channels may be simultaneously displayed on the screen of the image display apparatus, and/or how many channels may be simultaneously shown on the screen. Further, the channel guide information for each channel may be simultaneously displayed on each region of the screen while the programs of those channels are being displayed. As a variation, if specific channels exist solely for providing channel guide information or other type of information associated with programs, then those channels can be included in the plurality of channels to be tuned to by any one of the tuners of the broadcasting reception module of the image display apparatus 100. As a result, such information may also be simultaneously displayed on certain regions of the screen.

The present invention is applicable to any display device, and is advantageous for various reasons discussed above. For instance, multiple signals, images, etc. from a large number of different channels can be simultaneously displayed don the display device with use of just two tuners or three tuners. Further, depending on the set up configurations, the manner and time duration of displaying each of these channels may be managed in an effective and user-friendly manner.

The foregoing embodiments and advantages are merely exemplary and are not to be construed as limiting the present disclosure. For instance, any example, feature, and variation discussed above according to any one of various embodiments may be combined or applied in any other embodiment discussed above. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A channel information display method of an image display apparatus including a screen and a storage unit, the method comprising:
    displaying an image from a selected channel on at least one region of the screen;
    sequentially receiving, by a tuner, images from a plurality of channels;
    storing the received images in the storage unit;
    displaying the stored images from the plurality of channels simultaneously on multiple regions of the screen in response to a channel information function; and
    displaying a cursor on at least one of the multiple regions of the screen for displaying the stored images,
    wherein the at least one region having the cursor located thereon displays an image from a channel corresponding to the at least one region during a duration of time that the tuner is tuned to the channel corresponding to the at least one region while the cursor is located on the at least one region.

2. The method of claim 1, wherein the displayed stored images are moving images.

3. The method of claim 1, wherein the displaying steps are performed simultaneously so that the stored images and the image from the selected channel are simultaneously displayed on the screen.

4. The method of claim 1, wherein the multiple regions of the screen for displaying the stored images are arranged in a two or three-dimensional manner.

5. The method of claim 4, wherein each of the multiple regions of the screen has a polygonal shape.

6. The method of claim 1, wherein the stored images from similar channels are displayed next to each other in groups on the multiple regions of the screen.

7. The method of claim 1, wherein the displayed images from the plurality of channels further include channel guide information associated with the plurality of channels through which the stored images have been received.

8. The method of claim 1, wherein a size of each region on the screen having the cursor located thereon is increased with respect to an entire size of the screen.

9. The method of claim 1, wherein in the step of receiving, the duration of time that the tuner is tuned to the channel corresponding to a the region of the screen having the cursor located thereon is different from a duration of time that the tuner is tuned to other channels without the cursor.

10. The method of claim 1, wherein the image from the channel corresponding to the at least one region having the cursor located thereon comprises channel guide information.

11. An image display apparatus, comprising:
    a first tuner configured to receive an image from a selected channel;
    a second tuner configured to sequentially receive images from a plurality of channels;
    a storage unit configured to store the images received by the second tuner;
    a display unit including a screen; and
    a controller configured to control the display unit to display the image received from the first tuner on at least one region of the screen,
    the controller further configured to control the display unit to display the stored images from the plurality of channels simultaneously on multiple regions of the screen in response to a channel information function,
    wherein the controller is further configured to control the display unit to display a cursor on at least one of the multiple regions of the screen for displaying the stored images, and
    wherein the at least one region having the cursor located thereon displays an image from a channel corresponding to the at least one region having the cursor located thereon during a duration of time that the second tuner is tuned to the channel corresponding to the region while the cursor is located on the at least one region.

12. The image display apparatus of claim 11, wherein the displayed stored images are moving images.

13. The image display apparatus of claim 11, wherein the stored images from the plurality of channel and the image from the selected channel are simultaneously displayed on the screen.

14. The image display apparatus of claim 11, wherein the multiple regions of the screen for displaying the stored images are arranged in a two or three-dimensional manner.

15. The image display apparatus of claim 14, wherein each of the multiple regions of the screen has a polygonal shape.

16. The image display apparatus of claim 11, wherein the stored images from similar channels are displayed next to each other in groups on the multiple regions of the screen.

17. The image display apparatus of claim 11, wherein the displayed images from the plurality of channels further include channel guide information associated with the plurality of channels through which the stored images have been received.

18. The image display apparatus of claim 11, wherein a size of each region on the screen having the cursor located thereon is increased with respect to an entire size of the screen.

19. The image display apparatus of claim 11, wherein the duration of time that the second tuner is tuned to the channel corresponding to the region of the screen having the cursor located thereon is different from a duration of time that the second tuner is tuned to other channels without the cursor.

20. The image display apparatus of claim 11, wherein the image from the channel corresponding to the at least one region having the cursor located thereon comprises channel guide information.

21. The method of claim 1, wherein the multiple regions are facets of a rotatable three-dimensional object displayed on the screen.

22. The image display apparatus of claim 11, wherein the multiple regions are facets of a rotatable three-dimensional object displayed on the screen.

* * * * *